(12) United States Patent
Fazio

(10) Patent No.: US 7,102,906 B2
(45) Date of Patent: Sep. 5, 2006

(54) LOGIC AND MEMORY DEVICE INTEGRATION

(75) Inventor: Mario Fazio, Avezzano (IT)

(73) Assignee: Micron Technology, Inc., Boise, ID (US)

( * ) Notice: Subject to any disclaimer, the term of this patent is extended or adjusted under 35 U.S.C. 154(b) by 961 days.

(21) Appl. No.: 09/940,259

(22) Filed: Aug. 27, 2001

(65) Prior Publication Data

US 2002/0078278 A1    Jun. 20, 2002

(51) Int. Cl.
*G11C 5/06* (2006.01)
*G11C 7/00* (2006.01)

(52) U.S. Cl. .......................................... 365/63; 365/51
(58) Field of Classification Search .................. 365/63, 365/51, 230.03
See application file for complete search history.

(56) References Cited

U.S. PATENT DOCUMENTS

| | | | |
|---|---|---|---|
| 5,611,075 A | 3/1997 | Garde | |
| 5,930,185 A * | 7/1999 | Wendell | 365/201 |
| 5,933,859 A | 8/1999 | Klein | |
| 6,061,510 A | 5/2000 | Klein et al. | |
| 6,125,412 A | 9/2000 | Picard et al. | |
| 6,128,700 A * | 10/2000 | Hsu et al. | 711/122 |
| 6,298,426 B1 * | 10/2001 | Ajanovic | 711/172 |
| 6,311,261 B1 | 10/2001 | Chamdani et al. | |
| 6,311,263 B1 | 10/2001 | Barlow et al. | |

* cited by examiner

*Primary Examiner*—Son T. Dinh
(74) *Attorney, Agent, or Firm*—Leffert Jay & Polglaze, P.A.

(57) ABSTRACT

Memory devices are adapted for direct interface or virtual integration with a processor or other logic device through a local bus and isolated from a system bus. Such memory devices are capable of lower power requirements and reduced size due in part to the elimination of certain redundant circuitry. Direct interfacing through the local bus facilitates the elimination or reduction of input/output (I/O) buffer circuitry by eliminating the need to step up to and step down from typical system bus voltage levels. Communication between the memory device and a separate logic device occurs across the local bus at voltage levels compatible with internal logic levels of the memory device.

84 Claims, 5 Drawing Sheets

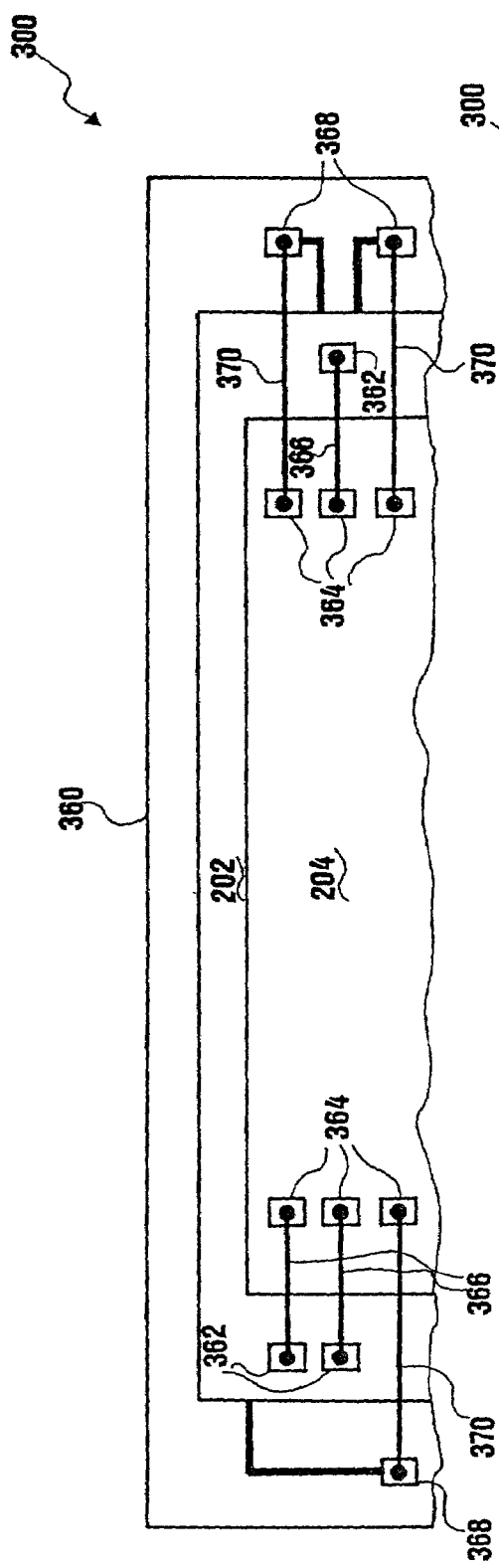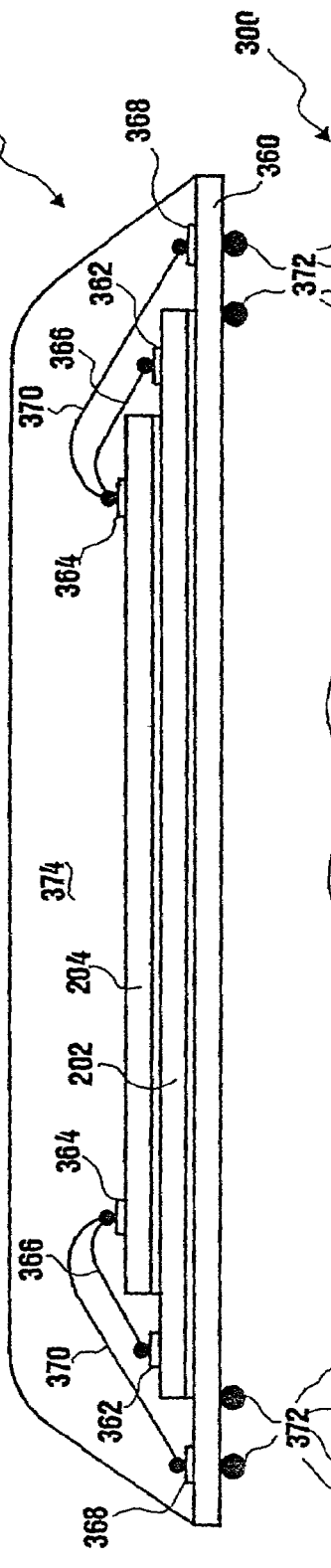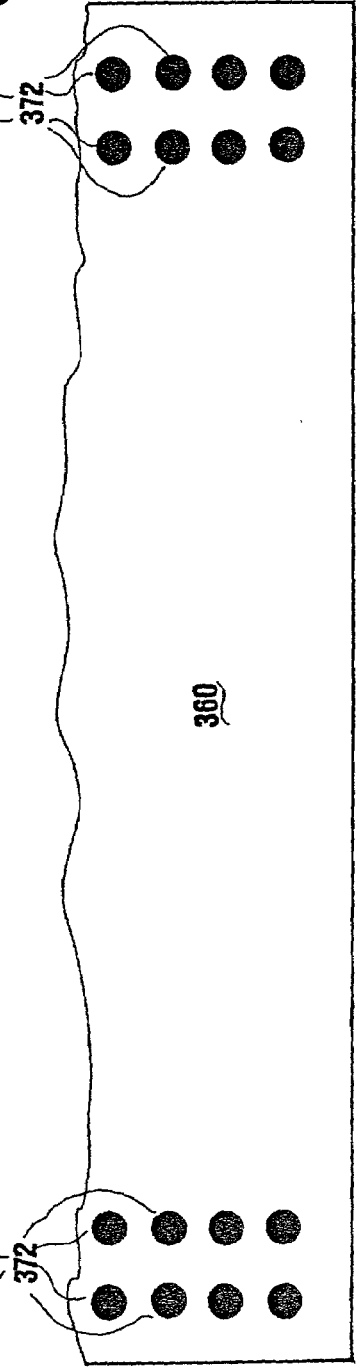
FIG. 3A
FIG. 3B
FIG. 3C

LOGIC AND MEMORY DEVICE INTEGRATION

TECHNICAL FIELD OF THE INVENTION

The present invention relates generally to semiconductor memory devices, and in particular, the present invention relates to semiconductor memory devices designed for integration with a processor or other logic device and systems produced therefrom.

BACKGROUND OF THE INVENTION

Electronic information handling or computerized systems, whether large machines, microcomputers or small handheld devices, require memory for storing data and program instructions. Various memory systems have been developed over the years to address the evolving needs of information handling systems. One such memory system includes semiconductor memory devices.

Semiconductor memory devices are rapidly-accessible memory devices. In a semiconductor memory device, the time required for storing and retrieving information generally is independent of the physical location of the information within the memory device. Semiconductor memory devices typically store information in a large array of cells. Data and status information of the memory device are provided to external devices through a set of DQ or data signal lines.

One particular form of semiconductor memory device is a non-volatile memory referred to as flash memory. Flash memory includes an array of memory cells made up of floating-gate transistors. A charge stored on the floating gate of the transistor determines the threshold voltage of the transistor. Various sensing methods can be used to detect the threshold voltage and thus determine the data value associated with an individual memory cell.

Computer, communication and industrial applications are driving the demand for memory devices in a variety of electronic systems. Specialized portable devices are consuming large quantities of flash memory and are continually pushing for lower voltages and higher densities to decrease power requirements, reduce size and increase functionality. Such portable devices include digital cellular or other wireless communication applications, digital cameras, audio recorders, personal digital assistants (PDAs) and test equipment.

In system applications requiring integration of logic devices and memory devices, three approaches are known. A first approach is to combine the logic device and the memory device in a single application-specific integrated circuit (ASIC) chip using a low-cost memory process. Such an approach is a low-cost alternative, but memory processes lack the metal layers and circuit complexity necessary to produce a high-performance logic device. Thus, such an ASIC provides relatively limited performance of the logic core.

A second approach is to combine the logic device and the memory device in a single-chip ASIC chip using a more sophisticated logic process providing for more metal layers and masks. While more expensive than the first approach, the logic process supports high-performance logic cores. In either of these approaches, the flexibility of the ASIC is limited as the functionality of the logic core and the size of the memory device are fixed. Modifications in response to market demands or new technologies generally require extensive retooling whether the modification affects only the memory portion or the logic portion of the ASIC. In addition, for related systems differing only in the amount of memory provided, separate ASICs would be required for each system.

FIG. 1A is a simplified block diagram of an electronic system 100 produced as a single-chip ASIC and coupled to a system bus 150. The electronic system 100 generally includes a memory core block 110 containing the memory cells and sensing circuitry; a control, logic and interconnect block 112; an analog block 114 providing the various internal voltage potentials from the supply potential; a logic core block 116; a static random access memory (SRAM) block 118 for caching data between the logic core block 116 and the memory core block 110; an input/output (I/O) block 120 for interfacing with the system bus 150; and often a customer-specific block 122 containing customer-specific functionality for the ASIC. It is noted that FIG. 1A is an abstraction of an electronic system and that the physical location and relative sizing of the individual blocks in the figure are not necessarily representative of an actual electronic system.

To provide more flexibility, albeit at increased cost, size and power requirements, a third approach to integrating a logic device and a memory device uses a separate logic device and a separate memory device. In this manner, the memory device and the logic device each can be produced using a process optimized for the particular device. Furthermore, responding to changing markets or new technology is relatively easy, in that only the relevant portion need be altered. In addition, related systems differing only in the amount of memory provided may be produced simply by substituting the appropriate memory device.

FIG. 1B is a simplified block diagram of an electronic system 100 having a memory device 102 and a logic device 104 each coupled to a system bus 150. The memory device 102 generally includes a memory core block 110 containing the memory cells and sensing circuitry; a control, logic and interconnect block 112; an analog block 114 providing the various internal voltage potentials from the supply potential; and an I/O block 124 for interfacing with the system bus 150. The logic device 104 generally includes a logic core block 116; a static random access memory (SRAM) block 118 for caching data between the logic core block 116 and the memory core block 110 of the memory device 102; an input/output (I/O) block 120 for interfacing with the system bus 150; and often a customer-specific block 122 containing customer-specific functionality for the logic device 104. An electronic system of the type shown in FIG. 1B may require 5–10% additional semiconductor real estate over an equivalent system of the type shown in FIG. 1A, due to the redundancy of the I/O circuitry. It is noted that FIG. 1B is an abstraction of an electronic system and that the physical location and relative sizing of the individual blocks or semiconductor chips in the figure are not necessarily representative of an actual electronic system.

For the reasons stated above, and for other reasons stated below that will become apparent to those skilled in the art upon reading and understanding the present specification, there is a need in the art for the integration of memory devices and logic devices supporting system flexibility, lower power requirements and reduced size.

SUMMARY OF THE INVENTION

The above-mentioned problems with memory devices and other problems are addressed by the present invention and will be understood by reading and studying the following specification.

Memory devices are described that are adapted for direct interface or virtual integration with a processor or other logic device through a local bus and isolated from a system bus. Such coupling of a memory device and logic device amounts to a virtual integration as the devices are capable of performance levels and die efficiencies approaching or substantially matching those of single-chip ASIC designs.

Memory devices of the type described herein are capable of lower power requirements and reduced size due in part to the elimination or reduction of certain redundant circuitry. Direct interfacing through the local bus facilitates the elimination or reduction of input/output (I/O) buffer circuitry by eliminating the need to step up to and step down from typical system bus voltage levels. Such memory devices thus require less semiconductor die area and have lower power demand due to the elimination or reduction of the buffer circuitry. Direct interfacing through the local bus may further facilitate lower power requirements and reduced size of the output driver circuitry; the output driver circuitry need only drive power levels compatible with internal logic demands of the logic device over a dedicated local bus rather than drive power levels to overcome the power dissipation associated with a general-purpose system bus.

For one embodiment, the invention provides a memory device. The memory device includes a memory array and at least one nominally-buffered signal line for communication between the memory array and an external device. The nominally-buffered signal line is substantially incapable of level translation and may further be non-buffered. The nominally-buffered signal line may include a data signal line, an address signal line or a control signal line. For a further embodiment, each signal line for communication between the memory device and the external device is a nominally-buffered signal line. The memory array may be an array of non-volatile floating-gate memory cells and the external device may be a logic device. For a still further embodiment, a nominally-buffered signal line is multiplexed to service more than one signal.

For another embodiment, the invention provides a memory device. The memory device includes a memory array and at least one nominally-buffered signal line for communication between the memory array and an external device. The nominally buffered signal line is substantially incapable of level translation and may further be non-buffered. The at least one nominally-buffered signal line includes at least one control signal line for receiving control signals from the external device, at least one address signal line for receiving address signals from the external device for accessing a portion of the memory array in response to the control signals, and at least one data signal line for receiving data signals from the external device for writing to the accessed portion of the memory array.

For yet another embodiment, the invention provides an electronic system. The electronic system includes a logic device for coupling to a system bus, a memory device separate from the logic device, and a local bus coupled between the logic device and the memory device. The memory device includes at least one nominally-buffered signal line coupled to the local bus. For a further embodiment, the electronic system may further include coupling areas on the logic device, including a first portion for coupling to the system bus and a second portion for coupling to the local bus. The electronic system may further include coupling areas on the memory device for coupling to the local bus, and direct connections coupled between the second portion of coupling areas on the logic device and the coupling areas on the memory device. The direct connections collectively make up the local bus. One example of an electronic system includes a stacked package or other multi-chip module. Another example of an electronic system includes a wireless communication device.

For still another embodiment, the invention provides a method of operating a memory device. The method includes communicating between the memory device and a logic device separate from the memory device, wherein communicating occurs across a local bus at voltage levels compatible with internal logic levels of the memory device. The local bus may include a number of direct connections between the memory device and the logic device. The method may further include communicating between the logic device and a system bus, wherein the system bus is distinct and isolated from the local bus. For a further embodiment, voltage levels for communication across the system bus are higher than the internal logic levels of the memory device. For a still further embodiment, communicating between the memory device and the logic device across the local bus occurs at a first frequency and communicating between the logic device and the system bus occurs at a second frequency, wherein the first frequency is higher than the second frequency. For a still further embodiment, communicating between the memory device and the logic device across the local bus occurs at a first word size and communicating between the logic device and the system bus occurs at a second word size, wherein the first word size is larger than the second word size.

The invention further provides methods and apparatus of varying scope.

BRIEF DESCRIPTION OF THE DRAWINGS

FIGS. 3A–3C are a top, side and bottom view, respectively, of an electronic system as a stacked package, wherein the electronic system has a memory device coupled to a logic device through a local bus.

DETAILED DESCRIPTION OF THE INVENTION

Figure 1A:
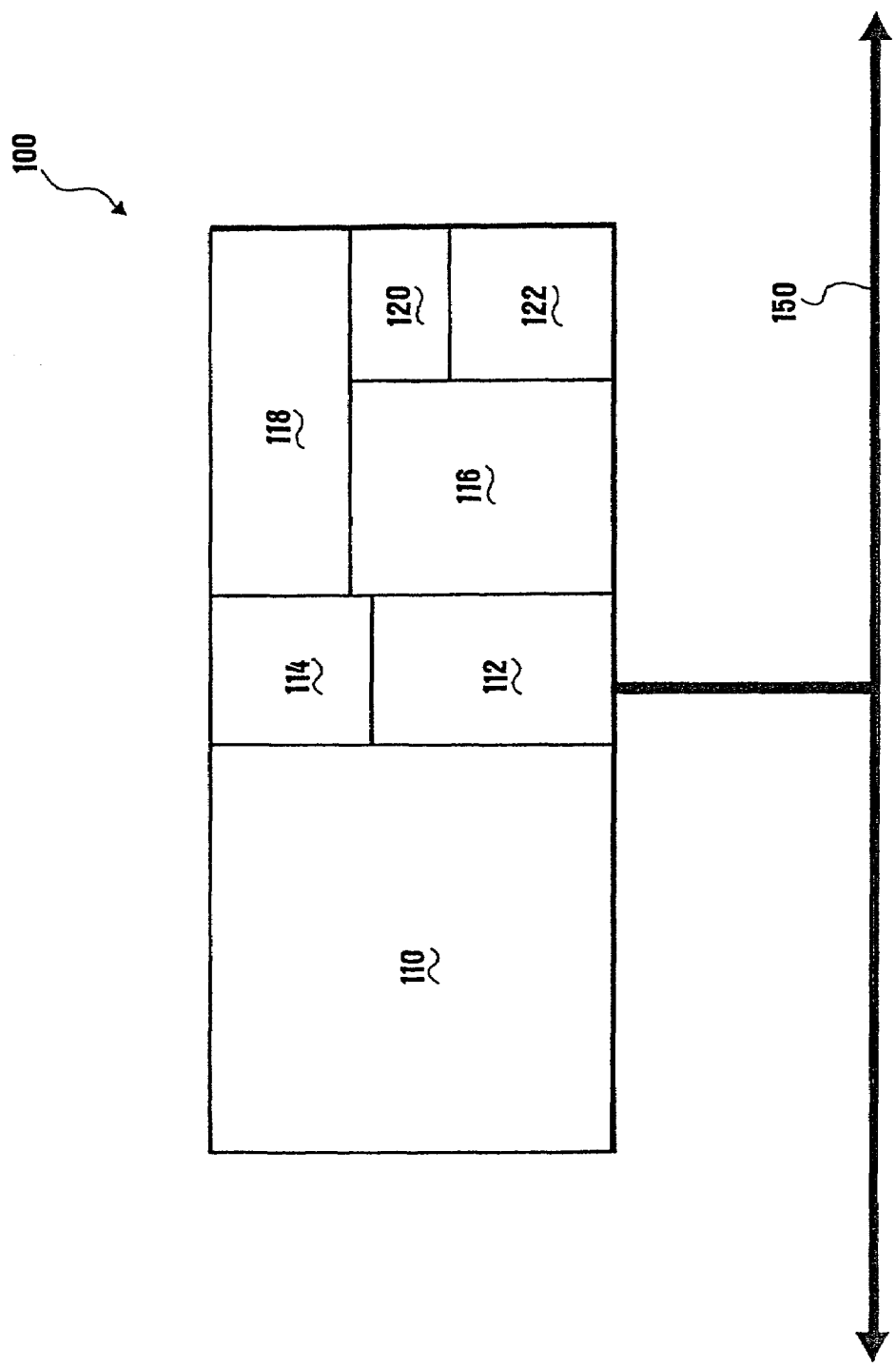
FIG. 1A is a simplified block diagram of an electronic system produced as a single-chip ASIC and coupled to a system bus.
Figure 1B:
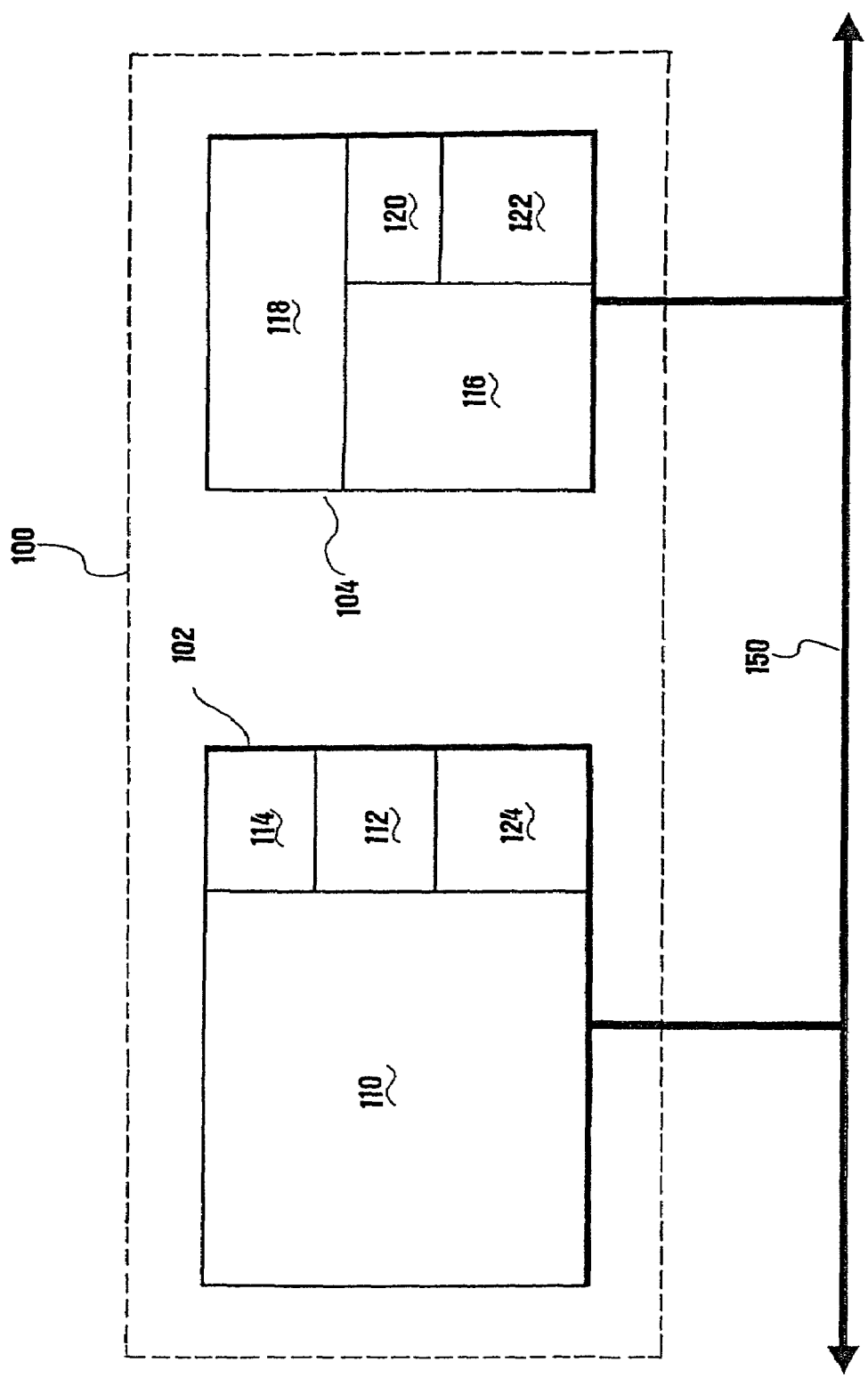
FIG. 1B is a simplified block diagram of an electronic system having a memory device and a logic device each coupled to a system bus.

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The terms wafer or substrate used in the following description includes any base semiconductor structure. Examples include silicon-on-sapphire (SOS) technology, silicon-on-insulator (SOI) technology, thin film transistor (TFT) technology, doped and undoped semiconductors, epitaxial layers of a silicon supported by a base semiconductor structure, as well as other semiconductor structures well known to one skilled in the art. Furthermore, when reference is made to a wafer or substrate in the following description, previous process steps may have been utilized to form regions/junctions in the base semiconductor structure, and the terms wafer and substrate include the underlying layers containing such regions/junctions. The following detailed description is, therefore, not to be taken in a limiting sense, and the scope of the present invention is defined only by the appended claims and equivalents thereof.

The various embodiments of the invention relate to the integration of a logic device and a memory device. Memory devices of various embodiments are adapted for communication directly with a logic device across a local bus. Memory devices of the various embodiments may include non-buffered devices. The local bus is dedicated to bi-directional communication between the logic device and the memory device. Voltages on the local bus are substantially at internal logic levels of the memory device.

For one embodiment, the local bus includes a plurality of direct connections between the memory device and the logic device. For a further embodiment, each direct connection of the local bus is a wire bond connection between a bonding pad on the memory device and a bonding pad on the logic device. For an alternate embodiment, each direct connection of the local bus is a solder bump connection between a bonding pad on the memory device and a bonding pad on the logic device. For another embodiment, each direct connection is dedicated to communication exclusively between a single bonding pad or other coupling area on the memory device and a single bonding pad or other coupling area on the logic device. The local bus is distinct and isolated from the system bus.

Use of a dedicated local bus between a memory device and a logic device facilitates elimination or reduction of buffer circuitry on the memory device. Input buffer circuitry adapted for level translation is normally included in a memory device to protect the device from voltage levels of a system bus. Output buffer circuitry adapted for high drive and level translation is normally included in a memory device to drive the voltage and load levels of an external system bus. With the memory device isolated from the system bus and the local bus carrying voltage levels substantially at internal logic levels of the memory device, no input buffer circuitry is necessary. Furthermore, the dedicated local bus has lower inductive, capacitive and resistive loads, thus reducing the sizing demands on the output buffer circuitry.

As used herein, a signal will have a voltage level compatible with internal logic levels of a device if the expected maximum voltage of the signal is substantially equal to or below the highest acceptable voltage level of the internal logic levels of the device. Elimination or reduction of buffer circuitry further facilitates semiconductor real estate efficiencies approaching those of a single-chip ASIC. Furthermore, electronic systems containing memory and logic devices in accordance with the various embodiments have lower power consumption than typical multiple-device systems as communication between the memory device and the logic device is at voltage levels substantially at internal logic levels rather than higher system bus levels.

While the local bus operates at voltages compatible with internal logic levels of the memory device such that elimination of input buffer circuitry is attainable, it may still be desirable to provide for signal conditioning of one or more of the input signals. Such signal conditioning may include matching impedance between the memory device and the logic device to reduce reflections that become increasingly detrimental at higher transmission frequencies. However, without the need for level translation between system bus voltage levels and the memory device logic levels, the input buffer circuitry can make use of smaller transistors adapted for signal conditioning and substantially incapable of level translation. Again, the reduction in input buffer size facilitates higher real estate efficiencies.

Figure 2A:
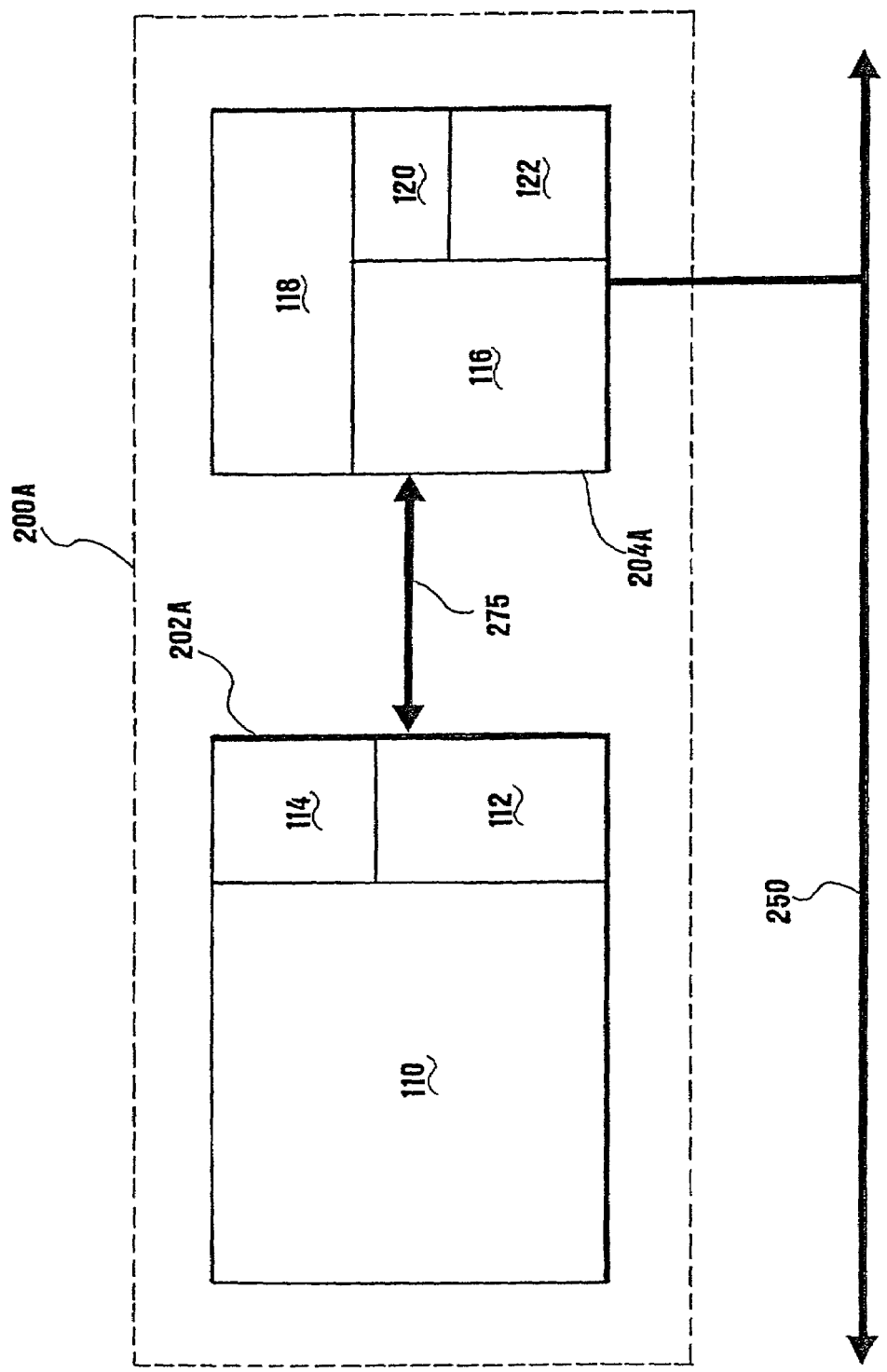
FIG. 2A is a simplified block diagram of an electronic system having a memory device and a logic device, wherein the memory device is coupled to the logic device through a local bus.

FIG. 2A illustrates a simplified block diagram of an electronic system 200A having a memory device 202A and a logic device 204A, wherein the memory device 202A is coupled to the logic device 204A through a local bus 275. The memory device 202A generally includes a memory core block 110 containing the memory cells and sensing circuitry; a control, logic and interconnect block 112, and an analog block 114 providing the various internal voltage potentials from the supply potential. The logic device 204A generally includes a logic core block 116; a static random access memory (SRAM) block 118 for caching data between the logic core block 116 and the memory core block 110; an input/output (I/O) block 120 for interfacing with the system bus 250; and often a customer-specific block 122 containing customer-specific functionality. It is noted that the functionality of the SRAM block 118 may be replaced by what is termed pseudo-static RAM. In pseudo-static RAM, a dynamic RAM (DRAM) array is automatically refreshed in the background such that it appears functionally as an SRAM array to external devices. This approach allows the use of DRAM technology in place of SRAM technology.

The memory device 202A is coupled to the logic device 204A through a local bus 275. The local bus 275 contains at least one conductive line for electrical communication of signals between the memory device 202A and the logic device 204A. Some common examples of conductive lines include wire bond connections and solder bump connections well known in the art. For one embodiment, the local bus 275 may include one line for each address signal, data signal, and control signal communicated between the memory device 202A and the logic device 204A. For another embodiment, at least a portion of the signals communicated between the memory device 202A and the logic device 204A are multiplexed such that at least one line of the local bus 275 services two or more signals.

Figure 2B:
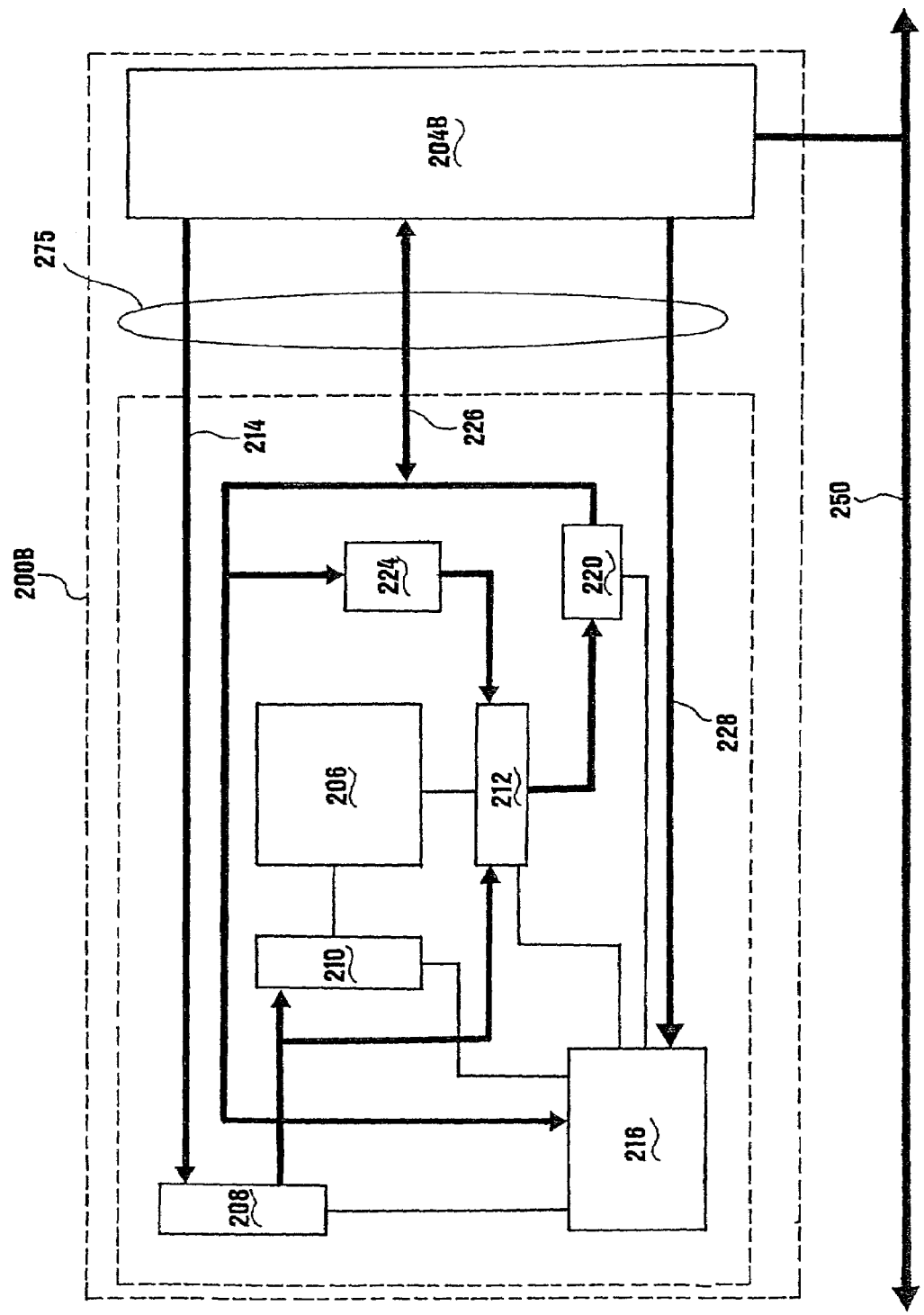
FIG. 2B is a functional block diagram of a memory device as part of an electronic system having a memory device and a logic device, wherein the memory device is coupled to the logic device through a local bus.

FIG. 2B illustrates a functional block diagram of a memory device 202B coupled to a logic device 204B of an electronic system 200B in accordance with one embodiment of the invention. FIG. 2B provides alternative detail of the memory device to more clearly describe the function of the local bus 275. The memory device 202B may, for example, be fabricated as an integrated circuit device on a semiconductor die of a semiconductor wafer. The memory device 202B includes a memory array 206. The memory cells (not shown) of the memory array 206 may be non-volatile floating-gate memory cells, such as in a flash memory device. Row access circuitry 210 and column access circuitry 212 are provided to decode address signals provided on address signal lines A0–Ax 214 from the local bus 275.

Row access circuitry 210 and column access circuitry 212 provide access to the memory cells of the memory array 206 in response to the decoded address signals.

An address latch circuit 208 is provided to latch the externally-applied address signals prior to decoding. Data output driver circuit 220 is included for outputting data over a plurality of data (DQ) signal lines 226 to the logic device 204B across the local bus 275. A data latch 224 is provided between the DQ signal lines 226 and the memory array 206 for storing data values (to be written to a memory cell) received on the DQ signal lines 226 from the logic device 204B across the local bus 275.

Command control circuit 216 decodes control signals provided on control signal lines 228 from the logic device 204B across local bus 275. The control signals are used to control the operations on the memory array 206, including data read, data write, and erase operations. For one embodiment, the memory device 202B is a nominally-buffered device. As used herein, a device or signal line will be nominally-buffered if it lacks buffer circuitry adapted for level translation, such as between a system bus level and an internal logic level, yet still permits other buffer circuitry for internal signal conditioning, such as impedance matching. For a further embodiment, the memory device 202B is a non-buffered device as no input buffer circuitry is coupled to the DQ signal lines 226, the address signal lines 214 or the control signal lines 228.

In a typical memory device, input buffer circuitry for level translation is provided between the DQ signal lines 226 and the data latch 224, between the address signal lines 214 and the address latch circuit 208, and between the control signal lines 228 and the command control circuit 216. Such level-translating input buffer circuitry is generally included to buffer or protect a device from input voltages that are detrimentally higher than the internal logic levels, such as those that might be utilized across a general-purpose system bus. As communications across the local bus 275 between the memory device 202B and the logic device 204B are at voltage levels associated with the internal logic levels of the devices, no input buffering is necessary for protection of the devices. However, as noted previously, impedance matching or other signal conditioning without level translation may be desirable. For one embodiment, at least one DQ signal line 226, at least one address signal line 214, and/or at least one control signal line 228 is nominally-buffered. For a further embodiment, at least one DQ signal line 226, at least one address signal line 214 and/or at least one control signal line 228 is non-buffered.

In addition to a reduction in input buffer circuitry, buffer circuitry of the data output driver circuit 220 may also be reduced. The local bus 275 as described herein has lower inductive, capacitive and resistive loads than a corresponding system bus 250. As such, the data output driver circuit 220 would be called upon to drive a significantly smaller load. Because of the smaller load, smaller output transistors may be used leading to lower power consumption and higher die efficiencies.

The memory device 202B has been simplified to facilitate a basic understanding of the features of the memory. A more detailed understanding of memory device functional components is known to those skilled in the art.

FIGS. 3A–3C are a top, side and bottom view, respectively, of an electronic system 300 as a stacked package or multi-chip module in accordance with one embodiment of the invention. For the electronic system 300, a logic device 204 is mounted to a memory device 202. The memory device 202 may further be mounted to a printed circuit board (PCB) or other carrier 360. The memory device 202 and the logic device 204 each have bonding pads or other coupling areas for providing electrical communication to various internal circuitry, such as control signal lines, address signal lines and DQ signal lines. The coupling areas 362 of the memory device 202 and the coupling areas 364 of the logic device 204 are depicted as bonding pads. Coupling areas 362 are coupled to coupling areas 364 through one or more direct connections 366. The direct connections 366 collectively make up the local bus.

The direct connections 366 are depicted as wire bonds, although other connections are known such as solder bump connections. The direct connections 366 have no intervening devices or other drops between a coupling area 362 of the memory device 202 and its corresponding coupling area 364 of the logic device 204. Advantageously, each direct connection 366 can thus be physically small, having relatively low power dissipation compared to a typical system bus. In general, the length of a typical system bus is at least one order of magnitude greater than the length of the direct connections 366. For one embodiment, each direct connection 366 is less than about 2 mm in length. For a further embodiment, each direct connection 366 is less than about 1 mm in length. Collectively, direct connections 366 form the dedicated local bus between the memory device 202 and the logic device 204. For one embodiment, the memory device 202 receives an external clock signal and/or power supply potentials from the logic device 204 through the local bus. For another embodiment, the memory device 202 receives an external clock signal and/or power supply potentials through a connection (not shown) to the carrier 360 or other external device.

The arrangement shown in FIGS. 3A–3C is particularly advantageous where the logic device 204 is smaller than the memory device 202, facilitating placement of coupling areas 362 and 364 around the perimeter of each corresponding device. Other arrangements are possible for electronic systems in accordance with the invention, including placing the memory device 202 on top of the logic device 204, mounting the memory device 202 and the logic device 204 on opposite sides of a carrier 360, and placing the memory device 202 and the logic device 204 substantially in the same plane, either adjoining or laterally spaced apart. In each case, coupling areas 362 and 364 should be accessible to simplify manufacture of the electronic system.

FIGS. 3A–3B further show a portion of coupling areas 364 of the logic device 204 coupled to coupling areas 368 of the carrier 360 through connections 370. The connections 370, as with the direct connections 366, are depicted as wire bonds. Such coupling areas 364 may be coupled to a system bus through the connections 370 for communication with external devices or user interfaces, such as a keyboard, buzzer, microphone, speaker, display, etc., of a wireless communication system. Such coupling areas 364 may further receive power supply potentials or other external signals, such as an external clock signal, through such connections 370. The connections 370 are generally coupled to these external devices, external signals or power supply potentials though external connections 372, depicted in FIGS. 3B–3C as solder bump connections. The portion of coupling areas 364 of the logic device 204 coupled to connections 370 is separate and distinct from the portion of coupling areas 364 of the logic device 204 coupled to direct connections 366. As shown in FIG. 3B, the electronic system 300 generally incorporates an encapsulant 374 to protect the devices and connections from such things as mechanical shock, harmful atmospheres, and electrical shorts.

In electronic systems in accordance with the invention, designers may further eliminate electrostatic discharge (ESD) protection in the memory device. As an example, in the electronic system 300 of FIGS. 3A–3B, the memory device 202 is isolated from a system bus by the interposing logic device 204. Furthermore, the direct connections 366 are insulated from external discharges by the encapsulant 374. Thus, the memory device 202 may be devoid of ESD protection, relying instead on any ESD protection contained in the logic device 204 or on the carrier 360.

With such close integration of a logic device and memory device as described herein, additional embodiments may further eliminate logic functions from the memory device, leaving only the memory array and access circuitry. The high bit-width, high-speed communication facilitated by the dedicated local bus allows use of the logic device to provide all logic functions to the memory device, such as command interpretation and address decoding. In this manner, decoded address signals may be sent from the logic device to the memory device for access of the memory array without further address decoding. Similarly, decoded command signals may be sent from the logic device to the memory device for control of operations on the memory array without further command interpretation.

CONCLUSION

Memory devices and electronic systems having a memory device and a logic device have been described facilitating increased performance, reduced power consumption and reduced cost. Memory devices of the various embodiments are adapted for communication across a dedicated local bus at voltages compatible with internal logic levels, thereby facilitating elimination or reduction of buffer circuitry. The various embodiments facilitate increased performance by supporting increased communication rates and larger word sizes between a memory device and a logic device. The various embodiments facilitate reduced power consumption by lowering voltages for communications between a separate memory device and a separate logic device to levels compatible with internal logic levels of the devices. The various embodiments facilitate reduced cost by allowing the memory portion of an electronic system to be produced using a relatively low-cost memory fabrication technique without detrimental impact on the logic portion of the electronic system, and by reducing semiconductor real estate usage to levels comparable to a single-chip ASIC device.

The various embodiments of the invention and their adaptation for the use of a local bus for communications between a memory device and a logic device provide certain additional advantages. The local bus between the memory device and the logic device is generally orders of magnitude lower in length relative to a system bus, thereby resulting in lower power dissipation through lower resistive losses. In addition to lower power dissipation relative to a system bus, the local bus further provides faster communication rates. The local bus, due to its relative length and lack of intervening devices or drops, will exhibit lower ringing, thereby improving communication reliability and facilitating higher clock frequencies between the memory device and the logic device. The local bus can also provide faster communications through the use of higher levels of parallelism. As an example, an electronic system having a memory device and logic device each supporting a 64-bit word can utilize a local bus including 64 DQ signal lines, despite having a system bus that might be limited to a 16-bit word. In this manner, the 64-bit word can be transferred between the memory device and the logic device in a single transfer of 64 bits, rather than four sequential transfers of 16 bits each.

By limiting the high-speed communication between a memory device and a logic device to the dedicated local bus, the system bus can be optimized for the relatively lower communication rates necessary for communications between the logic device and external devices or user interfaces. Accordingly, the bit width of the system bus may be reduced without detrimentally impacting system performance. The number of connections between the logic device and these external devices and user interfaces via the system bus can also be reduced, thereby reducing the magnitude of buffer circuitry required on the logic device, i.e., buffer circuitry for level translating can be limited to only those connections of the logic device coupled to the system bus.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method of operating a memory device, comprising:
communicating between the memory device and a logic device separate from the memory device, wherein communicating occurs across a local bus at voltage levels compatible with internal logic levels of the memory device;
wherein communications across the local bus to the memory device are received by at least one nominally-buffered signal line of the memory device.

2. The method of claim 1, further comprising:
communicating between the logic device and a system bus, wherein the system bus is distinct and isolated from the local bus.

3. The method of claim 1, wherein the at least one nominally-buffered signal line includes a non-buffered signal line.

4. The method of claim 1, further comprising:
sending a decoded address signal from the logic device to the memory device; and
accessing a memory array of the memory device in response to the decoded address signal without further address decoding.

5. The method of claim 1, further comprising:
sending a decoded command signal from the logic device to the memory device; and
controlling operations on a memory array of the memory device in response to the decoded command signal without further command interpretation.

6. A method of operating an electronic system having a memory device and a logic device separate from the memory device, the method comprising:
communicating between the memory device and the logic device across a local bus at voltage levels compatible with internal logic levels of the memory device, wherein the local bus comprises a plurality of direct connections between the memory device and the logic device; and
communicating between the logic device and a system bus, wherein the system bus is distinct and isolated from the local bus;

wherein communications across the local bus to the memory device are received by at least one nominally-buffered signal line of the memory device.

7. The method of claim 6, wherein the at least one nominally-buffered signal line includes a non-buffered signal line.

8. The method of claim 6, wherein voltage levels for communication across the system bus are higher than the internal logic levels of the memory device.

9. The method of claim 6, wherein the system bus has a length that is at least an order of magnitude greater than a length of the local bus.

10. The method of claim 6, wherein the system bus has a bit width that is less than a bit width of the local bus.

11. The method of claim 6, wherein communicating between the memory device and the logic device across the local bus occurs at a first frequency and communicating between the logic device and the system bus occurs at a second frequency, wherein the first frequency is higher than the second frequency.

12. The method of claim 6, wherein communicating between the memory device and the logic device across the local bus occurs at a first word size and communicating between the logic device and the system bus occurs at a second word size, wherein the first word size is larger than the second word size.

13. The method of claim 6, further comprising:
sending a decoded address signal from the logic device to the memory device; and
accessing a memory array of the memory device in response to the decoded address signal without further address decoding.

14. The method of claim 6, further comprising:
sending a decoded command signal from the logic device to the memory device; and
controlling operations on a memory array of the memory device in response to the decoded command signal without further command interpretation.

15. A method of operating an electronic system having a memory device and a logic device separate from the memory device, the method comprising:
communicating between the memory device and the logic device across a local bus at voltage levels compatible with internal logic levels of the memory device; and
communicating between the logic device and a system bus;
wherein voltage levels for communication across the system bus are higher than the internal logic levels of the memory device;
wherein the local bus comprises a plurality of direct connections between the memory device and the logic device; and
wherein the system bus is distinct and isolated from the local bus and has a bit width that is less than a bit width of the local bus.

16. The method of claim 15, wherein the system bus has a length that is at least an order of magnitude greater than a length of the local bus.

17. The method of claim 15, wherein communicating between the memory device and the logic device across the local bus occurs at a first frequency and communicating between the logic device and the system bus occurs at a second frequency, wherein the first frequency is higher than the second frequency.

18. The method of claim 15, wherein communicating between the memory device and the logic device across the local bus occurs at a first word size and communicating between the logic device and the system bus occurs at a second word size, wherein the first word size is larger than the second word size.

19. The method of claim 15, further comprising:
sending a decoded address signal from the logic device to the memory device; and
accessing a memory array of the memory device in response to the decoded address signal without further address decoding.

20. The method of claim 15, further comprising:
sending a decoded command signal from the logic device to the memory device; and
controlling operations on a memory array of the memory device in response to the decoded command signal without further command interpretation.

21. A method of operating an electronic system having a memory device and a logic device separate from the memory device, the method comprising:
communicating between the memory device and the logic device across a local bus at voltage levels compatible with internal logic levels of the memory device; and
communicating between the logic device and a system bus at voltage levels higher than the internal logic levels of the memory device;
wherein the local bus comprises a plurality of direct connections between the memory device and the logic device;
wherein communications across the local bus to the memory device are received by at least one nominally-buffered signal line of the memory device; and
wherein the system bus is distinct and isolated from the local bus and has a length that is at least an order of magnitude greater than a length of the local bus.

22. The method of claim 21, wherein the system bus has a bit width that is less than a bit width of the local bus.

23. The method of claim 21, wherein communicating between the memory device and the logic device across the local bus occurs at a first frequency and communicating between the logic device and the system bus occurs at a second frequency, wherein the first frequency is higher than the second frequency.

24. The method of claim 21, wherein communicating between the memory device and the logic device across the local bus occurs at a first word size and communicating between the logic device and the system bus occurs at a second word size, wherein the first word size is larger than the second word size.

25. The method of claim 21, further comprising:
sending a decoded address signal from the logic device to the memory device; and
accessing a memory array of the memory device in response to the decoded address signal without further address decoding.

26. The method of claim 21, further comprising:
sending a decoded command signal from the logic device to the memory device; and
controlling operations on a memory array of the memory device in response to the decoded command signal without further command interpretation.

27. A method of operating an electronic system having a memory device and a logic device separate from the memory device, the method comprising:
communicating between the memory device and the logic device across a local bus, wherein the local bus comprises a plurality of direct connections between the memory device and the logic device and wherein the local bus is distinct and isolated from a system bus; and communicating between the logic device and the system bus, wherein the system bus has a bit width that is less than a bit width of the local bus.

28. The method of claim 27, wherein communicating with the memory device occurs only through the logic device and the local bus.

29. A method of operating an electronic system having a memory device and a logic device separate from the memory device, the method comprising:
communicating between the memory device and the logic device at a first frequency across a local bus; and
communicating between the logic device and a system bus at a second frequency lower than the first frequency;
wherein the local bus comprises a plurality of direct connections between the memory device and the logic device;
wherein the system bus is distinct and isolated from the local bus and has a length that is at least an order of magnitude greater than a length of the local bus; and
wherein the system bus has a bit width that is less than a bit width of the local bus.

30. The method of claim 29, wherein communicating between the memory device and the logic device across the local bus occurs at a first word size and communicating between the logic device and the system bus occurs at a second word size, wherein the first word size is larger than the second word size.

31. The method of claim 29, further comprising:
sending a decoded address signal from the logic device to the memory device; and
accessing a memory array of the memory device in response to the decoded address signal without further address decoding.

32. The method of claim 29, further comprising:
sending a decoded command signal from the logic device to the memory device; and
controlling operations on a memory array of the memory device in response to the decoded command signal without further command interpretation.

33. A memory device, comprising:
a memory array; and
at least one nominally-buffered signal line, substantially incapable of level translation, for communication between the memory array and an external device.

34. The memory device of claim 33, wherein the at least one nominally-buffered signal line is a data signal line.

35. The memory device of claim 33, wherein the at least one nominally-buffered signal line is an address signal line.

36. The memory device of claim 33, wherein the at least one nominally-buffered signal line is a control signal line.

37. The memory device of claim 33, wherein each signal line for communication between the memory device and the external device is a nominally-buffered signal line.

38. The memory device of claim 33, wherein the at least one nominally-buffered signal line is a non-buffered signal line.

39. The memory device of claim 33, wherein the memory array is an array of non-volatile floating-gate memory cells and wherein the external device is a logic device.

40. The memory device of claim 33, wherein the at least one nominally-buffered signal line is multiplexed to service more than one signal.

41. The memory device of claim 33, wherein the at least one nominally-buffered signal line comprises:
a plurality of nominally-buffered data signal lines;
a plurality of nominally-buffered address signal lines; and
a plurality of nominally-buffered control signal lines.

42. The memory device of claim 33, wherein the at least one nominally-buffered signal line comprises:
at least one control signal line for receiving control signals from the external device;
at least one address signal line for receiving address signals from the external device for accessing a portion of the memory array in response to the control signals; and
at least one data signal line for receiving data signals from the external device for writing to the accessed portion of the memory array.

43. The memory device of claim 33, wherein the memory device is devoid of logic functions capable of command interpretation.

44. The memory device of claim 33, wherein the memory device is devoid of logic functions capable of address decoding.

45. A memory device, comprising:
a memory array; and
at least one control signal line for receiving decoded control signals from the external device to control operations on the memory array;
wherein the memory device is devoid of logic functions capable of command interpretation.

46. The memory device of claim 45, wherein each control signal line is a nominally-buffered signal line.

47. The memory device of claim 45, wherein the at least one control signal line is a non-buffered signal line.

48. The memory device of claim 45, wherein the memory array is an array of non-volatile floating-gate memory cells and wherein the external device is a logic device.

49. A memory device, comprising:
a memory array;
at least one address signal line for receiving decoded address signals from the external device; and
access circuitry to provide access to the memory array in response to the decoded address signals;
wherein the memory device is devoid of logic functions capable of address decoding.

50. The memory device of claim 49, wherein each address signal line is a nominally-buffered signal line.

51. The memory device of claim 49, wherein the at least one address signal line is a non-buffered signal line.

52. The memory device of claim 49, wherein the memory array is an array of non-volatile floating-gate memory cells and wherein the external device is a logic device.

53. A memory device, comprising:
a memory array;
at least one nominally-buffered control signal line, substantially incapable of level translation, for receiving control signals from the external device;
at least one nominally-buffered address signal line, substantially incapable of level translation, for receiving address signals from the external device for accessing a portion of the memory array in response to the control signals; and
at least one nominally-buffered data signal line, substantially incapable of level translation, for communicating data signals between the external device and an accessed portion of the memory array.

54. The memory device of claim 53, wherein each signal line for communication between the memory device and the external device is a nominally-buffered signal line.

55. The memory device of claim 53, wherein at least one nominally-buffered signal line is a non-buffered signal line.

56. The memory device of claim 53, wherein the memory array is an array of non-volatile floating-gate memory cells and wherein the external device is a logic device.

57. The memory device of claim 53, wherein at least one nominally-buffered signal line is multiplexed to service more than one signal.

58. The memory device of claim 53, wherein the memory device is devoid of logic functions capable of command interpretation.

59. The memory device of claim 53, wherein the memory device is devoid of logic functions capable of address decoding.

60. A memory device, comprising:
a memory array;
at least one control signal line for receiving control signals from the external device;
at least one address signal line for receiving address signals from the external device for accessing a portion of the memory array in response to the control signals; and
at least one data signal line for communicating data signals between the external device and an accessed portion of the memory array;
wherein at least one control signal line, address signal line or data signal line is substantially incapable of level translation.

61. The memory device of claim 60, wherein each control signal line, address signal line and data signal line is substantially incapable of level translation.

62. The memory device of claim 60, wherein the memory device is devoid of logic functions capable of command interpretation.

63. The memory device of claim 60, wherein the memory device is devoid of logic functions capable of address decoding.

64. A memory device, comprising:
a memory array;
at least one control signal line for receiving control signals from the external device;
at least one address signal line for receiving address signals from the external device for accessing a portion of the memory array in response to the control signals; and
at least one data signal line for communicating data signals between the external device and an accessed portion of the memory array;
wherein at least one control signal line, address signal line or data signal line is adapted for use with voltage levels that are compatible with internal logic levels of the memory array; and
wherein at least one control signal line, address signal line or data signal line is a nominally-buffered signal line.

65. An electronic system, comprising:
a logic device for coupling to a system bus;
a memory device separate from the logic device; and
a local bus coupled between the logic device and the memory device;
wherein the memory device includes at least one nominally-buffered signal line coupled to the local bus.

66. The electronic system of claim 65, wherein the at least one nominally-buffered signal line is a non-buffered signal line.

67. The electronic system of claim 65, further comprising:
a plurality of coupling areas on the logic device, including a first portion of the plurality of coupling areas on the logic device for coupling to the system bus and a second portion of the plurality of coupling areas on the logic device for coupling to the local bus;
a plurality of coupling areas on the memory device for coupling to the local bus; and
a plurality of direct connections coupled between the second portion of the plurality of coupling areas on the logic device and the plurality of coupling areas on the memory device, wherein the plurality of direct connections collectively make up the local bus.

68. The electronic system of claim 67, wherein the plurality of direct connections comprises a plurality of wire bond connections.

69. The electronic system of claim 67, wherein the plurality of direct connections comprises a plurality of solder bump connections.

70. The electronic system of claim 67, wherein the plurality of direct connections each have a length of less than about 2 mm.

71. The electronic system of claim 67, wherein the plurality of direct connections each have a length of less than about 1 mm.

72. The electronic system of claim 65, wherein the at least one nominally-buffered signal line is a data signal line.

73. The electronic system of claim 65, wherein the at least one nominally-buffered signal line is an address signal line.

74. The electronic system of claim 65, wherein the at least one nominally-buffered signal line is a control signal line.

75. The electronic system of claim 65, wherein each signal line for communication between the memory device and the logic device is a nominally-buffered signal line.

76. The electronic system of claim 65, wherein the memory device includes a memory array containing an array of non-volatile floating-gate memory cells.

77. The electronic system of claim 65, wherein the at least one nominally-buffered signal line comprises:
a plurality of nominally-buffered data signal lines;
a plurality of nominally-buffered address signal lines; and
a plurality of nominally-buffered control signal lines.

78. The electronic system of claim 65, wherein the memory device includes a memory array and the at least one nominally-buffered signal line comprises:
at least one control signal line for receiving control signals from the logic device;
at least one address signal line for receiving address signals from the logic device for accessing a portion of the memory array in response to the control signals; and
at least one data signal line for receiving data signals from the logic device for writing to the accessed portion of the memory array.

79. The electronic system of claim 65, wherein the electronic system is a wireless communication device.

80. The electronic system of claim 65, wherein the memory device is devoid of logic functions capable of command interpretation.

81. The electronic system of claim 65, wherein the memory device is devoid of logic functions capable of address decoding.

82. An electronic system, comprising:
a logic device for coupling to a system bus;
a memory device separate from the logic device; and
a local bus coupled between the logic device and the memory device;
wherein the memory device includes at least one nominally-buffered signal line coupled to the local bus; and wherein the memory device is devoid of logic functions capable of address decoding.

83. The electronic system of claim 82, wherein the memory device is further devoid of logic functions capable of command interpretation.

84. An electronic system, comprising:
a logic device for coupling to a system bus;
a memory device separate from the logic device; and
a local bus coupled between the logic device and the memory device;
wherein the memory device includes at least one nominally-buffered signal line coupled to the local bus; and
wherein the memory device is devoid of logic functions capable of command interpretation.

* * * * *

UNITED STATES PATENT AND TRADEMARK OFFICE
CERTIFICATE OF CORRECTION

PATENT NO. : 7,102,906 B2  
APPLICATION NO. : 09/940259  
DATED : September 5, 2006  
INVENTOR(S) : Fazio Page 1 of 1

It is certified that error appears in the above-identified patent and that said Letters Patent is hereby corrected as shown below:

On Title Page,  
insert:  
(30) Foreign Application Priority Data  
Dec. 15, 2000 (IT) ................RM2000A000671

Signed and Sealed this

Third Day of April, 2007

JON W. DUDAS  
*Director of the United States Patent and Trademark Office*